(12) United States Patent
Miyazawa et al.

(10) Patent No.: US 8,099,384 B2
(45) Date of Patent: Jan. 17, 2012

(54) OPERATION PROCEDURE EXTRAPOLATING SYSTEM, OPERATION PROCEDURE EXTRAPOLATING METHOD, COMPUTER-READABLE MEDIUM AND COMPUTER DATA SIGNAL

(75) Inventors: Natsumi Miyazawa, Kanagawa (JP); Shinichi Yada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 389 days.

(21) Appl. No.: 12/210,906

(22) Filed: Sep. 15, 2008

(65) Prior Publication Data

US 2009/0234867 A1    Sep. 17, 2009

(30) Foreign Application Priority Data

Mar. 14, 2008  (JP) ................. 2008-065561

(51) Int. Cl.
*G06F 7/00* (2006.01)
*G06F 17/00* (2006.01)
*G06K 15/00* (2006.01)
(52) U.S. Cl. ..................... 707/603; 358/1.14
(58) Field of Classification Search .................. 707/603; 358/1.14
See application file for complete search history.

(56) References Cited

U.S. PATENT DOCUMENTS

| 2006/0170962 A1 | 8/2006 | Nakamura |
| 2007/0073772 A1* | 3/2007 | Blue et al. ................ 707/104.1 |
| 2007/0136121 A1 | 6/2007 | Katsurabayashi |
| 2007/0279674 A1* | 12/2007 | Oomura ..................... 358/1.14 |

FOREIGN PATENT DOCUMENTS

| JP | A-10-247911 | 9/1998 |
| JP | A-2001-109647 | 4/2001 |
| JP | A-2003-308184 | 10/2003 |
| JP | A-2004-021430 | 1/2004 |
| JP | A-2006-211587 | 8/2006 |
| JP | A-2007-164224 | 6/2007 |

* cited by examiner

*Primary Examiner* — Michael Hicks
(74) *Attorney, Agent, or Firm* — Oliff & Berridge PLC

(57) ABSTRACT

An operation procedure extrapolating system includes a history recording unit, a sort unit and an extrapolating unit. The history recording unit records history records of processes that at least one image processing apparatus is instructed to perform in a series of operation procedures. Each history record includes operator information, time information, content information and an object image. The sort unit sorts the history records into sets defined for individual operations, based on a comparison among the object images of the recorded history records. The extrapolating unit extrapolates operation procedures in at least one of the individual operations, based on the content information of the history records included in the set defined for the at least one of the individual operations and a sequence of the operator information of the history records included in the set defined for the at least one of the individual operations.

6 Claims, 23 Drawing Sheets

FIG. 4

| | | | | | |
|---|---|---|---|---|---|
| Record 1 | 2007.08.01/12:00 | Nakamura | MF1 | print | IM11-Log |
| Record 2 | 2007.08.01/13:00 | Nakamura | MF1 | scan | IM12-Log |
| Record 3 | 2007.08.01/12:30 | Ito | MF1 | print | IM2-Log |
| Record 4 | 2007.08.03/17:00 | Tanaka | SC1 | scan | IM14-Log |
| Record 5 | 2007.08.03/09:00 | Ogawa | MF2 | print | IM3-Log |
| Record 6 | 2007.08.02/09:00 | Suzuki | MF2 | copy | IM13-Log |
| Record 7 | 2007.08.03/12:00 | Sato | MF3 | scan | IM4-Log |

FIG. 9

| | | | | | Category of form A / Category of form B / Category of form C |
|---|---|---|---|---|---|
| Record 1 | 2007.08.01/12:00 | Nakamura | MF1 | print | IM11-Log |
| Record 2 | 2007.08.01/13:00 | Nakamura | MF1 | scan | IM12-Log |
| Record 3 | 2007.08.01/12:30 | Ito | MF1 | print | IM2-Log |
| Record 4 | 2007.08.03/17:00 | Tanaka | SC1 | scan | IM14-Log |
| Record 6 | 2007.08.02/09:00 | Suzuki | MF2 | copy | IM13-Log |
| Record 5 | 2007.08.03/09:00 | Ogawa | MF2 | print | IM3-Log |
| Record 7 | 2007.08.03/12:00 | Sato | MF3 | scan | IM4-Log |

FIG. 12

| | | | | | Classification 1 | Classification 2 |
|---|---|---|---|---|---|---|
| Record 1 | 2007.08.01/12:00 | Nakamura | MF1 | print | IM11-Log | |
| Record 2 | 2007.08.01/13:00 | Nakamura | MF1 | scan | IM12-Log | |
| Record 4 | 2007.08.03/17:00 | Tanaka | SC1 | scan | IM14-Log | |
| Record 6 | 2007.08.02/09:00 | Suzuki | MF2 | copy | IM13-Log | |
| Record 3 | 2007.08.01/12:30 | Ito | MF1 | print | | IM2-Log |

FIG. 14

| | | | | | Classification 1 |
|---|---|---|---|---|---|
| Record 1 | 2007.08.01/12:00 | Nakamura | MF1 | print | IM11-Log |
| Record 2 | 2007.08.01/13:00 | Nakamura | MF1 | scan | IM12-Log |
| Record 6 | 2007.08.02/09:00 | Suzuki | MF2 | copy | IM13-Log |
| Record 4 | 2007.08.03/17:00 | Tanaka | SC1 | scan | IM14-Log |

FIG. 15

| | | | | | Classification 12 |
|---|---|---|---|---|---|
| Record 11 | 2007.08.01/12:00 | Yamada | MF1 | print | IM21-Log |
| Record 12 | 2007.08.01/13:00 | Suzuki | MF2 | copy | IM22-Log |
| Record 15 | 2007.08.02/09:00 | Tanaka | SC1 | scan | IM23-Log |

FIG. 18

| | | | | | Classification 1 / Classification 2 |
|---|---|---|---|---|---|
| Record 1 | 2007.08.01/12:00 | Nakamura | MF1 | print | IM11-Log |
| Record 2 | 2007.08.01/13:00 | Nakamura | DB1 | scan | IM12-Log |
| Record 4 | 2007.08.03/17:00 | Tanaka | DB1 | scan | IM14-Log |
| Record 6 | 2007.08.02/09:00 | Suzuki | DB1 | scan | IM13-Log |
| Record 3 | 2007.08.01/12:30 | Ito | MF1 | print | IM2-Log |

FIG. 20

| Record 2 | 2007.08.01/13:00 | Nakamura | DB1 | scan | IM12-Log |
| Record 6 | 2007.08.02/09:00 | Suzuki | DB1 | scan | IM13-Log |
| Record 4 | 2007.08.03/17:00 | Tanaka | DB1 | scan | IM14-Log |

OPERATION PROCEDURE EXTRAPOLATING SYSTEM, OPERATION PROCEDURE EXTRAPOLATING METHOD, COMPUTER-READABLE MEDIUM AND COMPUTER DATA SIGNAL

CROSS-REFERENCE TO RELATED APPLICATIONS

This application is based on and claims priority under 35 USC 119 from Japanese Patent Application No. 2008-65561 filed Mar. 14, 2008.

BACKGROUND

1. Technical Field

The invention relates to an operation procedure extrapolating system, an operation procedure extrapolating method, a computer-readable medium and a computer data signal.

2. Related Art

In recent times, the network technology and information equipments such as PC (personal computer), a printer and a copying machine come into widespread use, and a work efficiency of handling documents in offices is dramatically improved. To the contrary, leakage of information utilizing these information equipments is increasing. For example, such cases have been known that in-house confidential documents are illegally printed/copied and taken out to the outside of the company, and the like.

In order to suppress such leakage of information, to track down a leakage source, and the like, nowadays such a system is utilized gradually that images being printed, copied, facsimile-transmitted, or scanned by image processing equipments such as a printer, a copying machine, a multifunction machine (a machine equipped integrally with functions of network printer, network scanner, copying machine, etc.), a FAX (facsimile machine) and a scanner are stored as image logs.

SUMMARY

According to an aspect of the invention, an operation procedure extrapolating system includes a history recording unit, a sort unit and an extrapolating unit. The history recording unit records history records of processes that at least one image processing apparatus is instructed to perform in a series of operation procedures. Each history record includes operator information indicating an operator who instructs execution of a corresponding process, time information indicating a time at which the corresponding process is executed, content information indicating contents of the corresponding process, and an object image as an object of the corresponding process. The sort unit sorts the history records into sets defined for individual operations, based on a comparison among the object images included in the respective history records recorded in the history recording unit. The extrapolating unit extrapolates operation procedures in at least one of the individual operations, based on (i) the content information of the history records included in the set defined for the at least one of the individual operations and (ii) a sequence of the operator information of the history records included in the set defined for the at least one of the individual operations.

BRIEF DESCRIPTION OF THE DRAWINGS

Exemplary embodiments of the invention will be described in detail based on the following figures, wherein:

FIG. 4 is a view showing the log records, which are shown in FIG. 3 and are arranged in order of identification numbers;

FIG. 9 is a view showing a result of sorting a group of log records shown in FIG. 4, for each form (report form).

FIG. 12 is a view showing a result of fine-sorting a group of log records corresponding to one form, for each same report form (i.e., for each individual operation);

FIG. 14 is a view showing a group of log records handled as a target of the analyzing process shown in FIG. 13;

FIG. 15 is a view showing an example of another group of log records corresponding to the same form as the group of log records shown in FIG. 1;

FIG. 18 is a view showing an example of subsets of the log records for each same document, which are found from the examples of the work flow shown in FIG. 17;

FIG. 20 is a flowchart showing an example of the analyzing process to be performed for the subsets of the log records according to the modification example;

DETAILED DESCRIPTION

Exemplary embodiments of the invention will be explained below with reference to the accompanying drawings.

In the following exemplary embodiments, an "operation flow" represents procedures of a work that is done in an office or the like using a document. For example, first a section staff A as a user creates a report document or the like by a client PC based on a predetermined format and prints a paper document by a printer. Then, a section chief B accepts this paper document, puts a check stamp (date stamp) after reviewing contents of the paper document, and read the document by a scanner to store the document in a PC. Then, a manager C accepts this paper document, puts an approval stamp (date stamp) on this document, then reads the document by a scanner to transmit it a person who is in charge of this operation in the next section, and transmits image data of the report document to the next section. Such an operation flow is often done in offices in which paper documents and electronic documents are used in a mixed manner. This example shows the operation flow, which is not managed by a system such as a workflow system. Printing and reading using an image processing machine such as a printer, a scanner or a multifunction machine are frequently done in the operation flows that are managed by a system.

Figure 1:
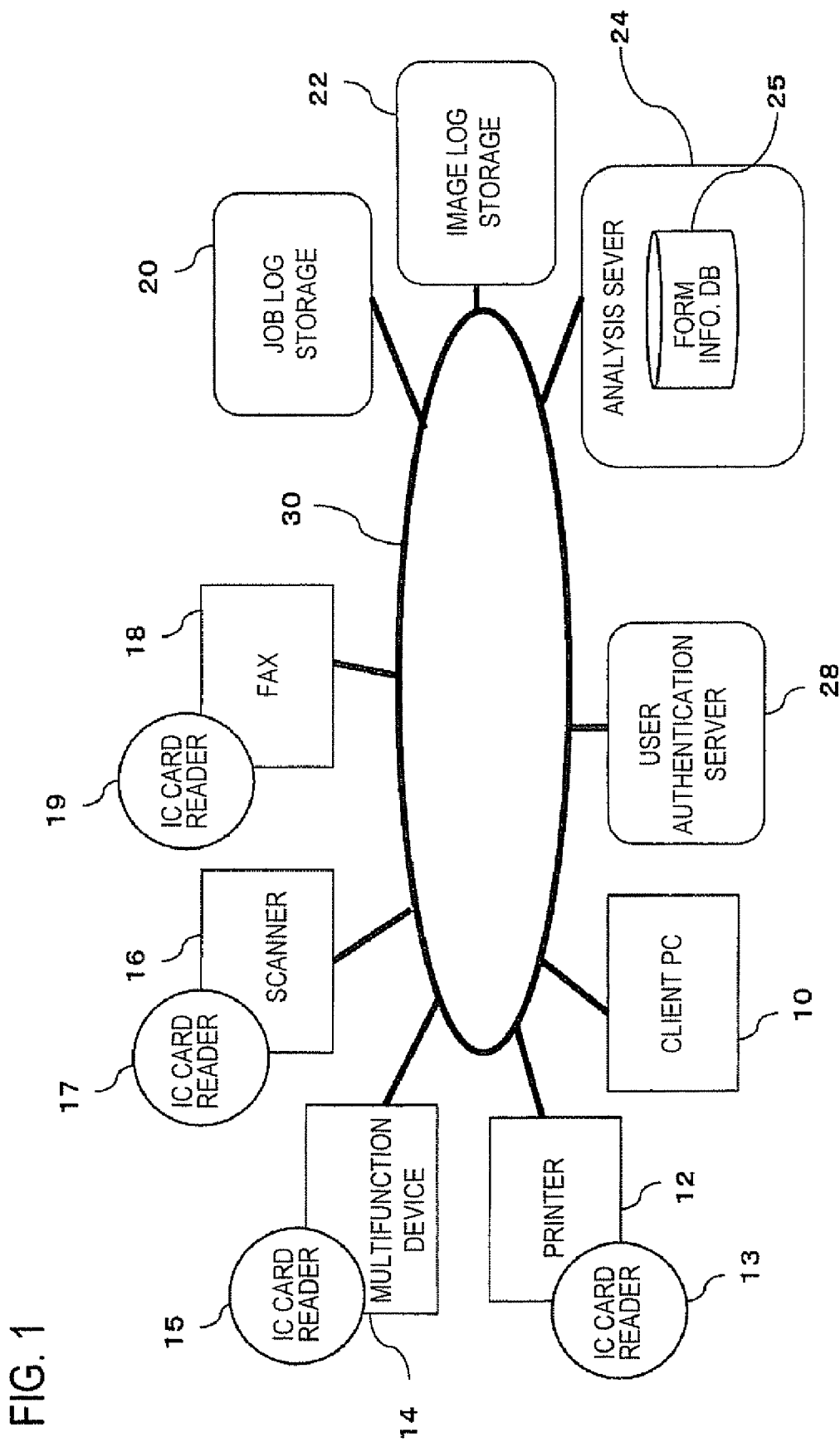
FIG. 1 is a view showing an example of the system configuration according to an exemplary embodiment of the invention.

FIG. 1 is a view showing an example of the system configuration of this exemplary embodiment. An operation of the system will be described in line with an example of the operation flow hereinafter.

A user logs on a client PC (personal computer) 10, creates a document necessary for an operation, and issues a print command of the document to a printer 12. The printer 12 receives report print data and the print command, and stores them in a built-in storage device. The print command includes an ID number of the user who logs on the client PC 10, and the like. An IC card reader 13 is connected to the printer 12, and the user causes the IC card reader 13 to read an IC card as a user IDentification card. The printer 12 executes a print command including an ID number that is identical with the user ID number read from the IC card reader 13, among the print commands stored in the storage device thereof.

When executing the print command, the printer 12 generates a job log, and stores the job log in a job log storage server 20 that is connected to the printer 12 via a network 30. The job log is record data of the job (process) executed by an image processing equipment such as the printer 12 and contains attribute information having the following items, for example. It is noted that the items of the attribute information listed below are just examples. There is no necessity that the jog log should contain all the following items. Also, the jog log may contain items other than the following items.

Process contents: process contents such as print, copy, scan or FAX

Process time: time at which a process is executed (time stamp)

Place: an installation place of a concerned equipment (a printer or the like; e.g., a room name, a floor name, or the like)

Equipment name: a name used to uniquely specify the concerned equipment

Document name: a name of a document that is instructed to be printed (this column may be empty in copy, scan, FAX, etc. because this information cannot be acquired in those process)

Number of pages of a document:
  number of pages constituting the concerned document Required number: number of print or copy Paper size: a size of a paper that is subjected to the process User's name: ID number of a user who instructs the process User's authority: authority information of a user's operation (described later)

Also, when executing the print command, the printer 12 generates an image log and stores this image log in an image log storage server 22 connected to the printer 12 via the network 30. The image log is image data of a document that the image processing equipment processes (e.g., prints or scans) in response to the command. When the processed document consists of plural pages, the image log containing image data of respective pages may be generated. In this case, the image data of plural pages may be generated as multi-page image data (like TIFF). A color space of the image log is set in full color in this exemplary embodiment, but is not limited to this color space. A palette image in which colors are limited, a gray-scale image, or a black-and-while binary image may be employed. A format of the image log is not particularly limited, but JPEG is employed in this exemplary embodiment. There is no need that an image resolution should be set to be extremely high, but a resolution that is set so low that contents of a document cannot be read make no sense. Therefore, in this exemplary embodiment, it is assumed that a resolution is set to 200 dpi.

The job log storage server 20 stores the received job logs in a built-in database or the like. The image log storage server 22 stores the received image logs in a built-in database or the like. The job log and the image log of the same job are stored while being associated with each other, for example, by a method of affixing the same job ID (identification information) thereto. In this exemplary embodiment, the job log and the image log, which are associated with each other, are collectively called a "log record".

In this exemplary embodiment, for the convenience of explanation, the case where the job log and the image log are stored in the separate servers 20 and 22 will be described by way of example. However, this case is only one instance among many situations. The job log storage server and the image log storage server may be provided as separate servers, or may be provided as separate databases in the same server. Also, the job logs and the image logs may be managed by one database, and may also be managed under the same schema.

An analysis sever 24 has a function of handling log information stored in the job log storage server 20 and the image log storage server 22 collectively as the log record and analyzing an operation flow from groups of the log records. This analyzing process will be described in detail later. In FIG. 4, the analysis sever 24 is connected independently to the network 30. However, functions of the analysis sever 24 may be installed into the job log storage server 20 or the image log storage server 22.

The user's authority, which is one of attribute information of the job log, is information relating to an authority over the user's operation. For example, the user's authority may indicate that "the user has the authority to do the operation", "the user has the authority to approve the operation", "the user has the authority to approve the operation in a higher rank", or the like. A user authentication server 28 manages the information of the user's authority and is connected to the network 30. When generating the job log, the printer 12 inquires of the user authentication server 28 about the user's authority based on the user ID, acquires the user's authority from the user authentication server 28, acquires the user's authority from the user authentication server 28 and incorporates the user's authority into the job log as one of the attribute information. As another example, the printer 12 may not grant the information of the user's authority, but the job log storage server 20 may acquire the information of the user's authority from the user authentication server 28 in a stage where the job log is stored in the job log storage server 20, and then record such information in the job log. As still another example, the analysis sever 24 may inquire of the user authentication server 28 about the user's authority every time when the information of the user's authority is required in a log record analysis, described later, executed by the analysis sever 24.

The case where the printer 12 executes the job is described above. The case where a multifunction machine 14 copies a paper document is also similar. That is, the multifunction machine 14 generates a job log and an image log at the same time when it copies a paper document, and then stores the job log and the image log in the job log storage server 20 and the image log storage server 22, respectively. An ID number of a user who instructs the copying is obtained from an IC card reader 15. Since a document name cannot be acquired in the copying unlike the printing, the document name of the attribute information of the job log is still blank.

Also, the case where a scanner 16 scans a paper document is also similar. That is, the scanner 16 generates a job log and an image log at the same time when it generates image data by scanning a paper document, and then registers the job log and the image log in the job log storage server 20 and the image log storage server 22, respectively. Also, the case where a FAX machine 18 transmits and receives a facsimile letter is also similar. The FAX machine 18 generates a job log and an image log while doing its original process operation, and registers the job log and the image log in the job log storage server 20 and the image log storage server 22, respectively.

Although the identification information of the user who instructs printing can be acquired from the client PC 10, the identification information of the user who instructs copying, scanning, or facsimile cannot be acquired from the client PC 10. Therefore, the IC card readers 15, 17, 19 are provided to the multifunction machine 14, the scanner 16, and the FAX machine 18, respectively. These IC card readers 15, 17, 19 read the user ID number stored in the ID card of the user, and set the read information as a user name of the attribute information of the job log. The equipment from which the user ID number is acquired is not limited to the IC card reader. For example, the user may input directly his/her ID number from a user interface of the multifunction machine, or the user may choose the ID number from a user list displayed on the user interface.

In FIG. 1, one printer 12, one multifunction machine 14, one scanner 16 and one FAX machine 18 are illustrated. However, plural equipments of any type may be provided on the network 30.

In this system, the log records each containing an image log relating to a work that a corresponding user performs by using the printer 12, the multifunction machine 14 or the like are stored in the job log storage server 20 and the image log storage server 22. In this exemplary embodiment, when these groups of log records are analyzed by the analysis sever 24, an operation flow executed by the users can be extrapolated.

Figure 2:
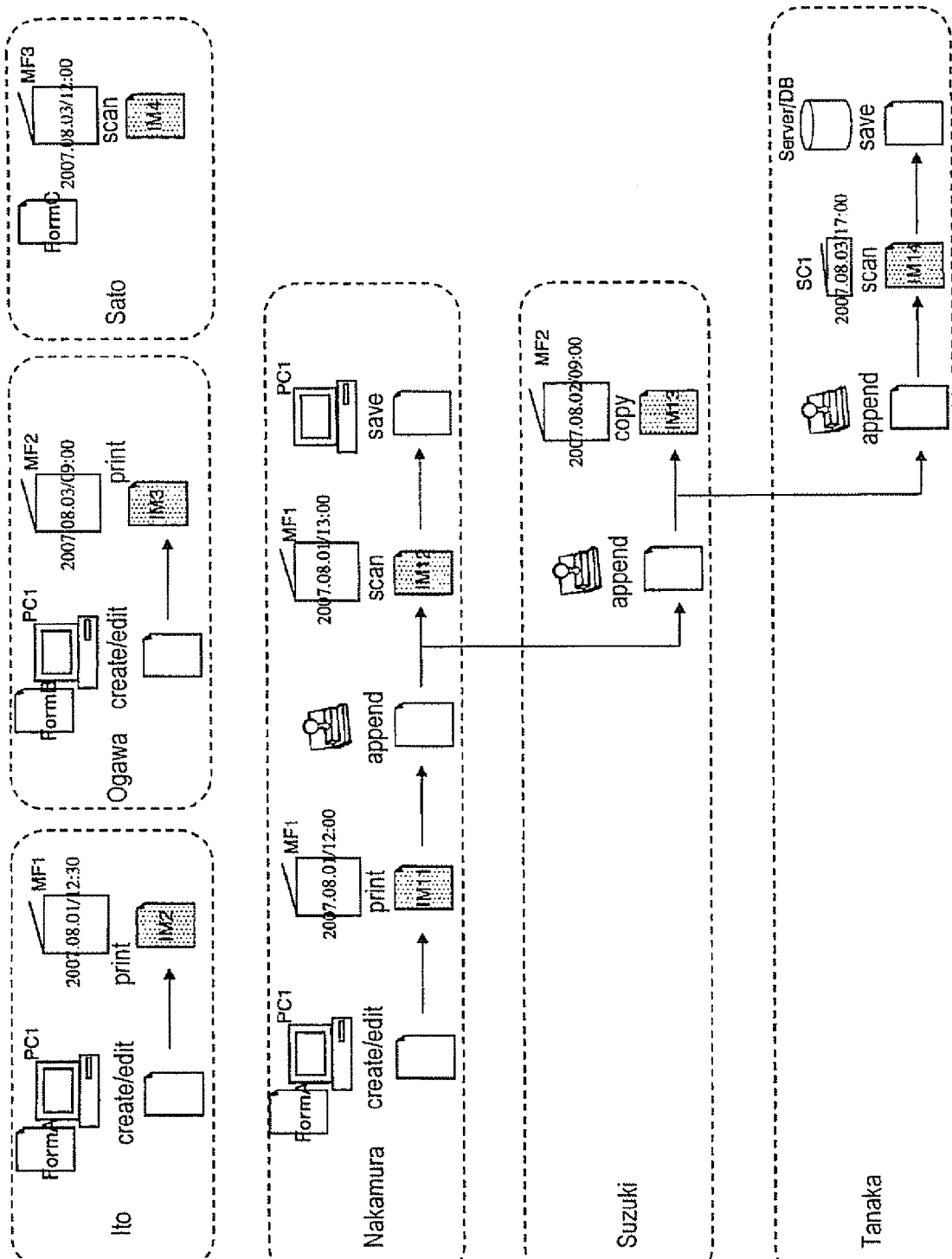
FIG. 2 is a view showing examples of a work flow carried on in an office.

FIG. 2 shows a situation that six users performs an operation such as printing, scanning, or the like by utilizing multifunction machines MF1, MF2, MF3 and a scanner SC1. In the example shown in FIG. 2, Nakamura creates a document in a form A (e.g., an approval document) by a client PC1, prints the document by the multifunction machine MF1, appends a note (writes a memo; e.g., puts a date stamp) onto the document, and then transfer the document to Suzuki. Nakamura also scans the document by the multifunction machine MF1, and saves it for the purpose of own use. Then, Suzuki appends a note onto the paper to which Nakamura appended the note, and transfers it to Tanaka and copies the document by the multifunction machine MF2 for the purpose of own use. Then, Tanaka appends a note to the paper to which Nakamura and Suzuki appended the notes, scans the paper by the scanner SC1 to manage it in their section, and saves it in the document management server.

In this manner, when the users do work occurring in an office by using the equipment having the log generating/registering function such as the printer 12, the multifunction machine 14, the scanner 16 and/or the FAX machine 18, the log records including the job logs and the image logs are generated. Then, the job logs and the image logs are stored in the job log storage server 20 and the image log storage server 22, respectively.

Figure 3:
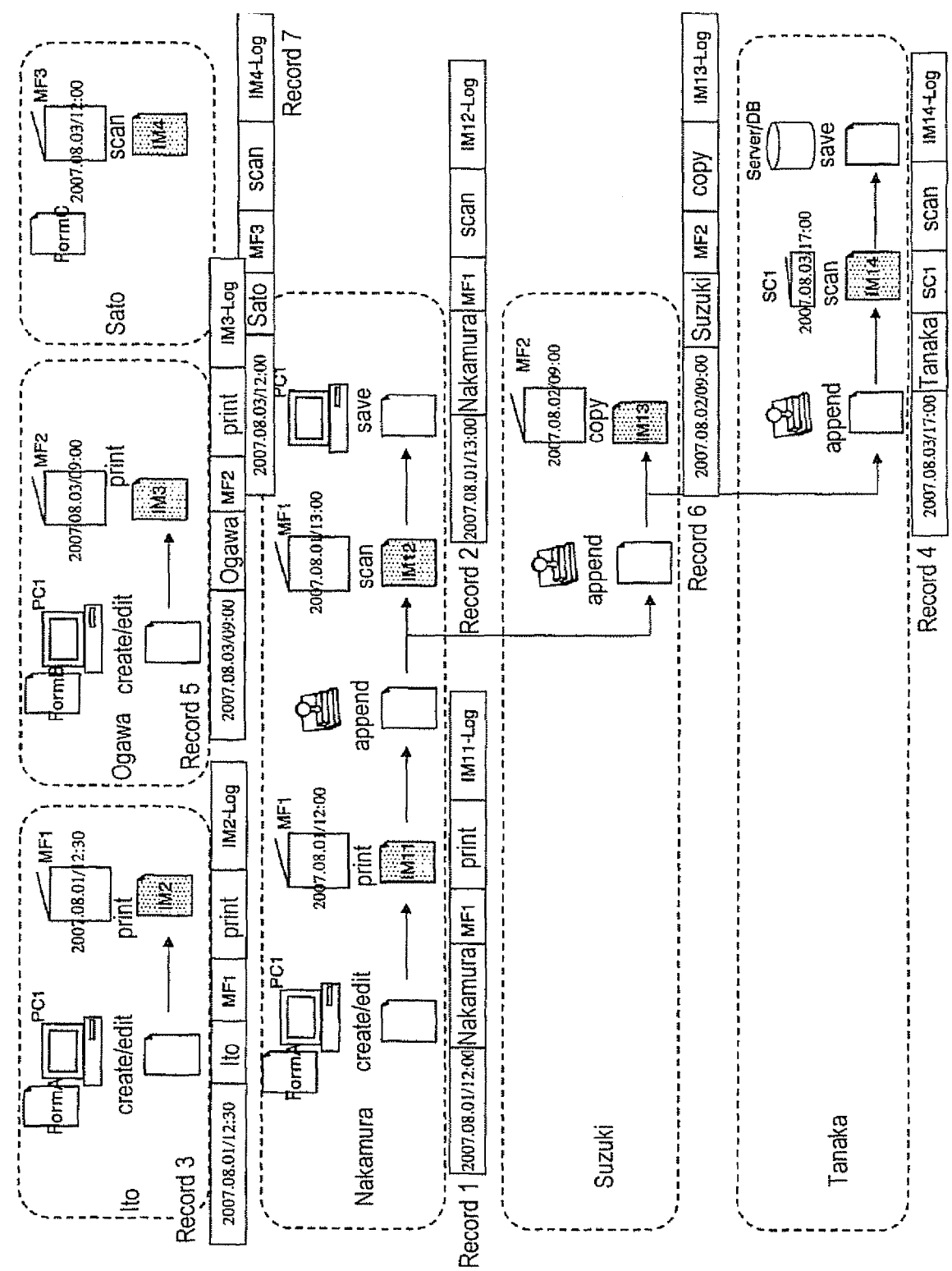
FIG. 3 is a view showing examples of log records generated in respective work stages of the works shown in FIG. 2.

FIG. 3 shows how the operations made by the six persons are recorded as the log records. For example, when Ito creates a document in the form A by the client PC1 and prints it by the multifunction machine MF1, a record 3 is stored to include (i) a job log having time (2007.08.01/12:30) at which the document is printed by the multifunction machine MF1, person ID (Ito), equipment name (MF1), and operation contents (print), and (ii) an image log having image data expressed by an identifier "IM2-Log". The log records of other operations are similar to the above. Here, the items of the log records shown in FIG. 3 are given merely as an example. There is no necessity that all these items should be contained, or the items other than the given items may be contained. A list of groups of stored log, records in this example is summarized in FIG. 4.

The analysis sever 24 of this exemplary embodiment finds the operation flow, which the users or the like perform, by analyzing these stored log records. A process of detecting/extrapolating the operation flow will be described with reference to a flowchart shown in FIG. 5 hereunder.

First, the analysis sever 24 performs a form recognition process on the image logs of a large amount of log records stored in the job log storage server 20 and the image log storage server 22, to thereby determine image logs that are presumed to have the same format (i.e., created from the same report form; S11).

Figure 6:
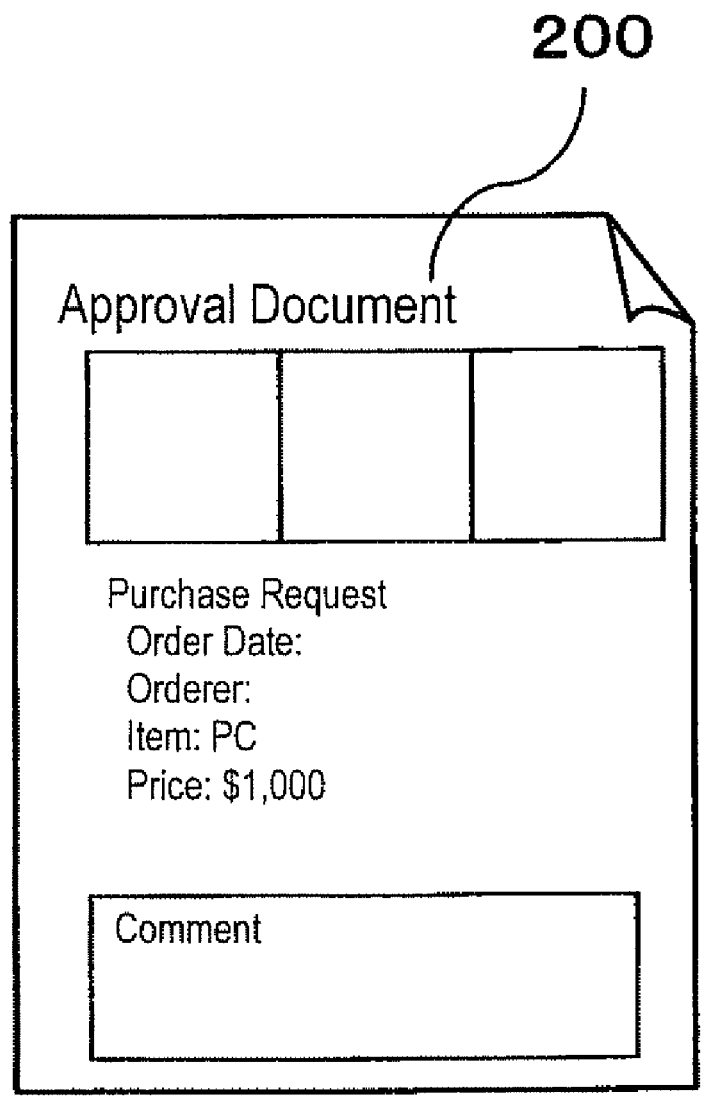
FIG. 6 is a view showing an example of a report form.

In the form recognition process, the analysis sever 24 sorts these image logs into the respective forms by comparing these image logs with the report form data registered in a form information DB 25. As shown in FIG. 6, report form data 200 is data indicating an image of a report form in which some columns are still blank, for example. In this case, it is assumed that various report form data 200 that will possibly be utilized are registered in advance in the form information DB 25 by an administrator. The existing technology can be employed in determining a form. For example, horizontal/vertical linear components constituting a table as major constituent elements of a report are extracted as feature quantities from both of an image log and the report form data 200 by image processing, and then it is determined what report form is used in the image log, by comparing the feature quantities of the extracted linear components with each other. Here, only the feature quantities may be registered as the report form data 200 instead of the full image of the report form. With this form determination method, a large number of stored image logs can be sorted into sets (categories) of the respective same type report forms.

Figure 7:
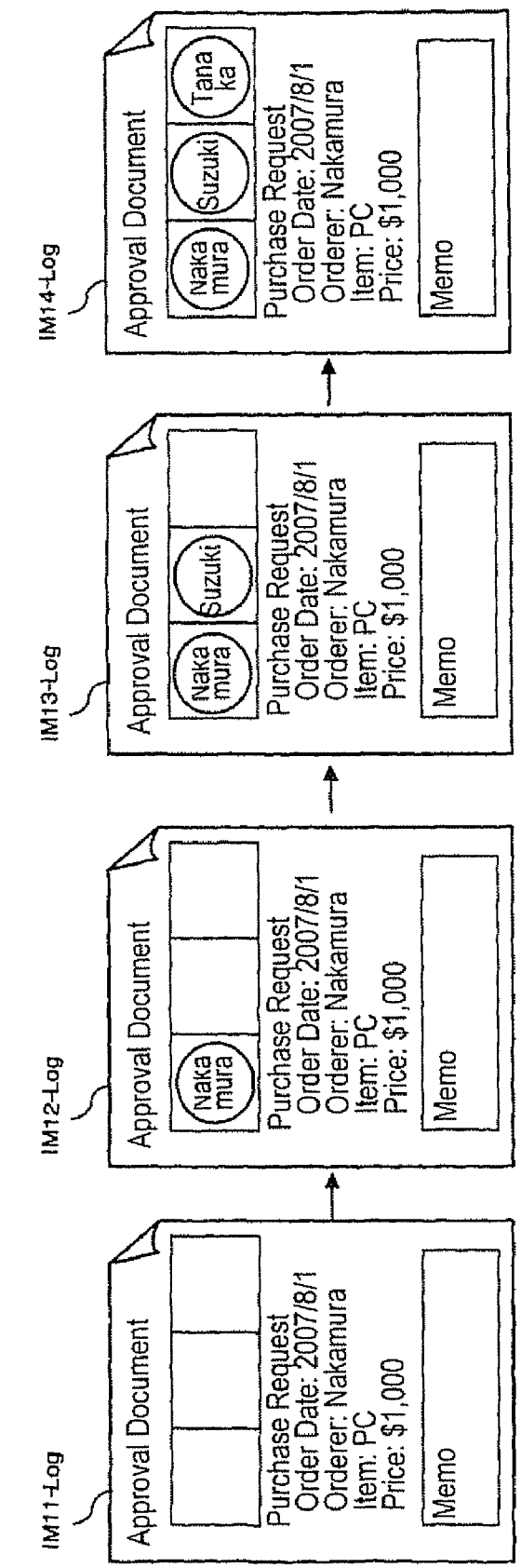
FIG. 7 is a view showing examples of image logs generated in respective stages of the operation flow.
Figure 8:
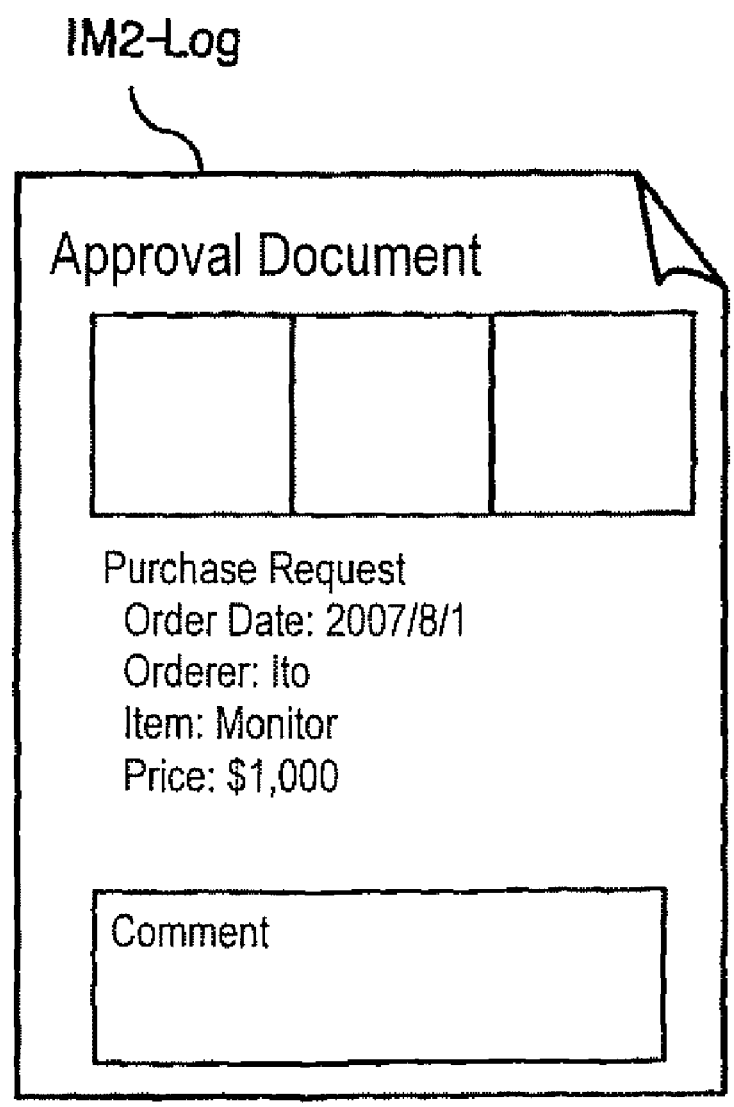
FIG. 8 is a view showing an example of an image stored as an image log.

For example, of the image logs of the respective log records shown in FIG. 4, the image logs "IM11-Log", "IM12-Log", "IM-13-Log", and "IM14-log" are shown in FIG. 7, and the image log "IM2-Log" is shown in FIG. 8. These five image logs are determined by the form recognition process (S11) as ones created based on the report form data 200 of the form A shown in FIG. 7. Therefore, the records 1, 2, 3, 4, 6 of the log records shown in FIG. 4 are sorted into the category of the form A. Also, it is assumed that, in step S11, the record 5 is sorted into the category of the form B and that the record 7 is sorted into the category of the form C. FIG. 9 shows a sorted result obtained by performing the form recognition process in step S11 on the groups of log records shown in FIG. 4

Next, the image logs of each of the sets (categories), which are the sort result in step S11 are automatically sorted by a similar image search technology or the like. Thereby, of the log records belonging to each set, log records belonging to a same document, that is, log records belonging to a same individual operation are determined (S12). Then, the log records of each set are fine sorted into subsets of same documents based on this determination result (S13).

The "same document" mentioned herein denotes an individual document that is transferred in an individual operation (for example, a report that is created, checked, and then approved). Even if its written contents are changed step by step by appending or correcting the document in each process stage of the individual operation, such a document is still handled as a document belonging to the same individual operation. The "same document" is defined in that meaning. For example, when a request to purchase an equipment X is made as an individual operation along with an operation flow of a "purchase request" of equipments, a "written purchase request report to purchase the equipment X" corresponds to the "same document" mentioned herein. At first, a drafter writes fills out necessary information to create a "written purchase request report", and then a checker puts a check stamp thereon. In this case, both the report in the creation stare and the report in the check stage have the "same document" relation with each other.

When performing one individual operation, users create a report using the report form data 200 corresponding to the individual operation. Then, the created report is circulated among persons concerned. During this circulation, the respective persons concerned append a memo (containing a stamp) to the received report or correct the received report, and then transfer it to the next concerned person. In this framework, reports for use in plural individual operations may be created based on one report form data 200. In steps S12 and S13, the log data having been sorted into the respective report forms are further sorted into subsets of the individual operations. It is determined as to whether or not reports are used in the same individual operation, based on a similarity among images of the reports (image logs).

Here, for example, in many operation flows, a person in charge puts a date stamp on a report after printing the report and then, a check stamp and an approval stamp are put thereon or a comment is written therein in subsequently procedures. In steps S12 and S13, it is necessary to determine image logs of reports belonging to the same individual operation without influence of such stamps and comments.

It is common that stamps and comments are made in predetermined areas, e.g., a stamp column, a comment column, or the like. Therefore, in order to determine the image logs belonging to the same individual operation, "non-appended areas" of the image logs other than "appended areas" such as the stamp column, the comment column, and the like may be compared with each other. Documents having a high similarity in the "non-appended areas" can be determined as the same document. The "non-appended area" includes areas in which a document title, date, a creator name, data, etc. are described. If the similarity between the images is calculated by referring only to these "non-appended areas", the same document can be determined irrespective of the influence of the stamp or the appended comment.

Figure 10:
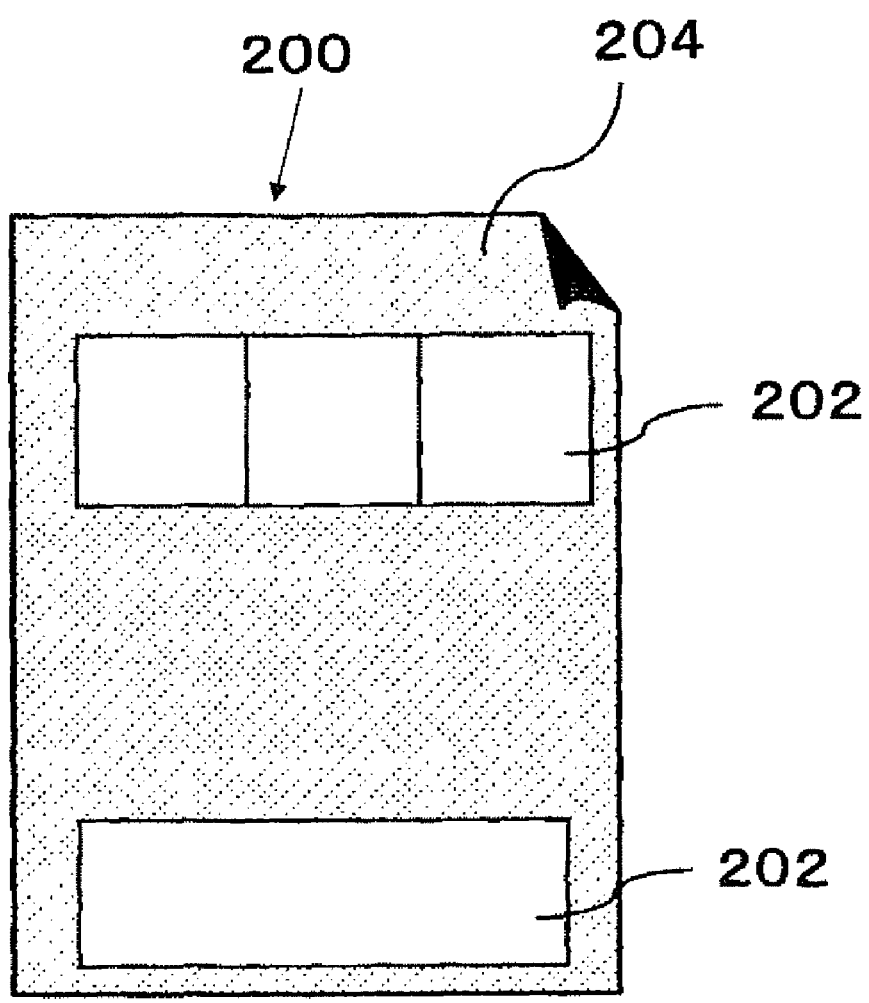
FIG. 10 is a view showing an example of an appended area and a non-appended area in a form.

FIG. 10 shows an "appended area" 202 and a "non-appended area" 204 in the report form data 200 shown in FIG. 7. Discrimination information between the "appended area" 202 and the "non-appended area" 204 may be created in advance by a form creator, and may be registered in association with the report form data 200.

Figure 11:
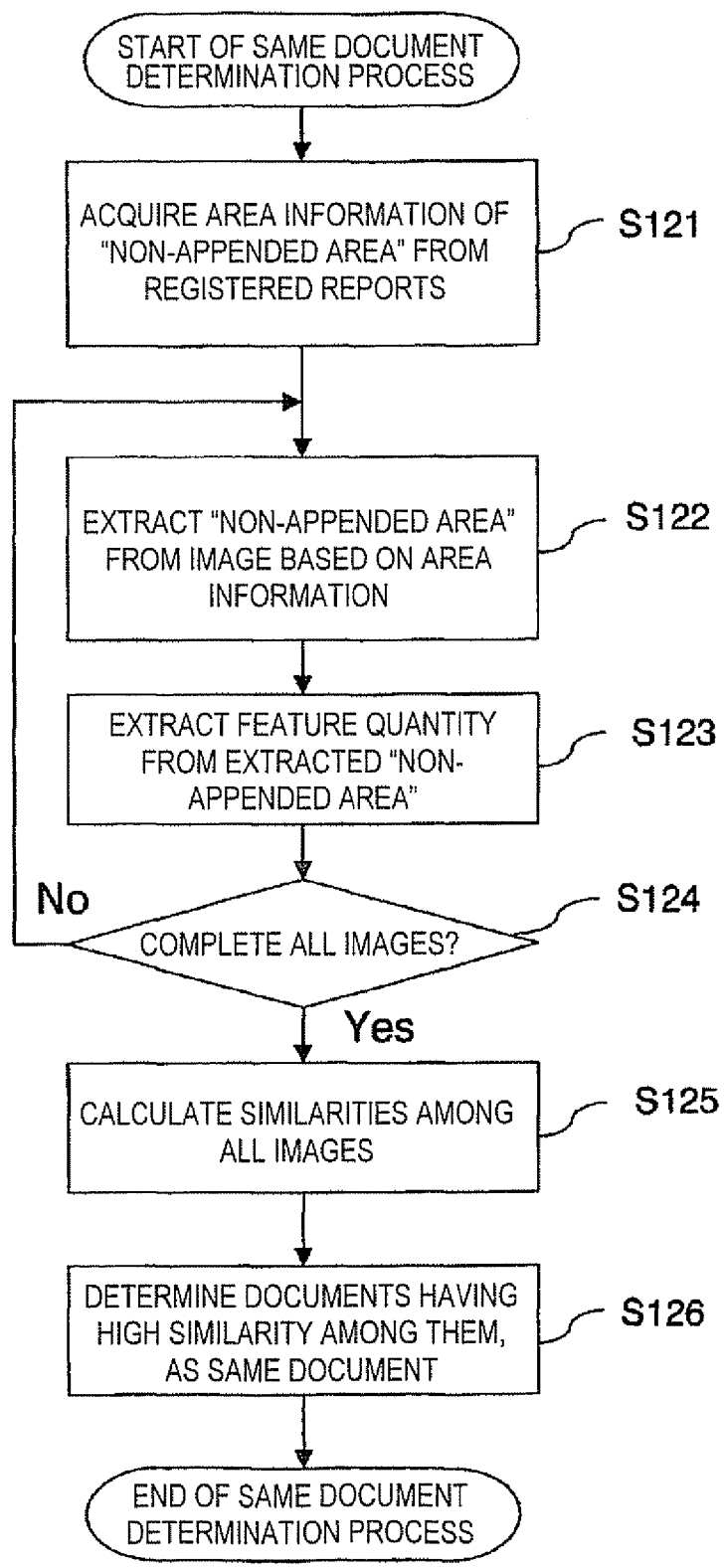
FIG. 11 is a flowchart showing an example of procedures of a same document determination process.

An example of detailed procedures in steps S12 and S13 is shown in FIG. 11. These procedures are performed on a set of image logs (log records) of each report form (operation type) obtained by the automatic sorting in step S11.

In these procedures, firstly, area information of a "non-appended area" is acquired from the report form data 200 corresponding to a set of interest (the set of interest has already been specified in S11; S121). Then, an image of the "non-appended area" is extracted from image data of each image log belonging to the set of interest, based on this area information (S122). Then, a feature quantity is extracted from the extracted area (S123). As this feature quantity, for example, a so-called image feature quantity may be employed. Specifically, the extracted area is divided into blocks having a certain size; an average brightness, an average color and the like are calculated for each block; and average brightnesses, average colors and the like of all the blocks are calculated as a feature quantity vector. In this case, the feature quantity is not limited to the image feature quantity described above. As another specific example, a character string may be extracted from the extracted area by performing the OCR process on the extracted area; the character string may be disassembled into words so that the words are written with a space therebetween (for example, see US 2006/0015326 A) (this disassembling process may be performed when the extracted character string is written in Japanese); and a combination of appearing words and frequencies of appearance may be employed as the feature quantity vector. In this manner, the feature quantities are extracted from all the image logs as the vectors (S124). Then, similarities among all the image logs are calculated by comparing the feature quantity vectors among all the image logs (S125). The similarities among the feature quantity vectors may be Euclidean distances in the feature quantity space or distances calculated by another method. A smaller distance value in the feature quantity space is considered to indicate a higher similarity. This concept is similar to the concept of the similarity in the image search. A combination of images having high similarity therebetween (thereamong) is determined as a same document (S126). In this determination, a user may set a threshold value in advance, and then may determine as to whether or not image logs belong to a same document by comparing the similarity between the image logs with the threshold value.

According to this fine-sorting process, of the records 1 to 4 and 6, which are sorted into the category of the form A in the example of FIG. 9, the records 1, 2, 4, and 6 (corresponding to IM11-Log, IM12-Log, IM13-Log, IM14-Log shown in FIG. 7) are sorted into a subset for a certain same individual operation. Also, the record 3 (corresponding to IM2-Log) is sorted into a subset for another individual operation. The fine-sorted result about the category of the form A is shown in FIG. 12.

Figure 13:
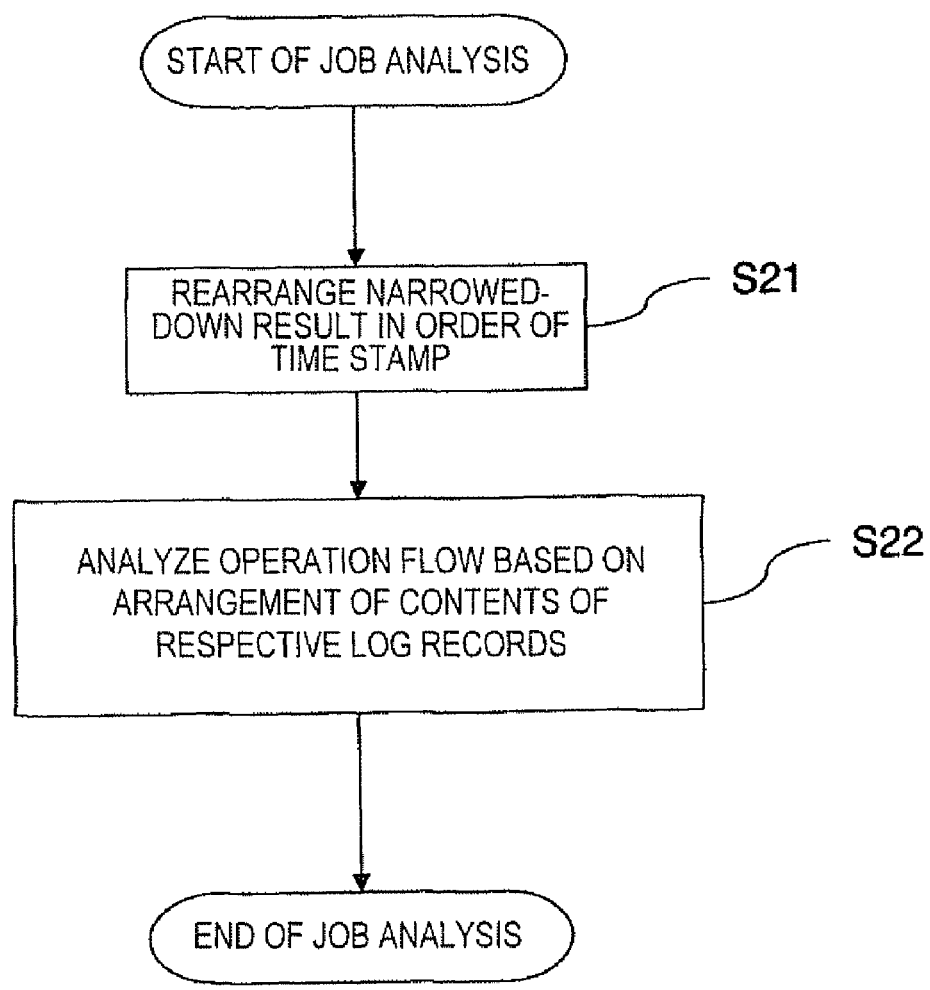
FIG. 13 is a flowchart showing an example of a analyzing process to be performed for a group of fine-sorted log records.

Then, the operation flow is extrapolated by analyzing the job log of the respective log records in each subset of the fine-sorted result (S14). Detailed procedures of step S14 are shown in FIG. 13.

In these procedures, the log records in each subset are rearranged in order of process times (time stamps. S21). Then, an operation flow is extrapolated based on the arrangement of the contents of the respective log records (S22).

FIG. 14 shows a result of the process at step S21 in which the respective log records of the subset for the classification 1 of FIG. 12 are rearranged in order of process time.

In step S22, the operation flow is analyzed based on information of a group of the rearranged log records, for example, the arrangement of the attribute values of the job logs. For example, the operation flow may be extrapolated from a sequence of user IDs of the job log in the group of rearranged log records. In the example shown in FIG. 14, with regard to the form A, an operation flow that "a report in the form A is circulated in sequence of Nakamura→Suzuki→Tanaka" can be extrapolated.

Here, when an authority, a job title or the like of each user is paired with a corresponding user ID, not only an operation flow expressed by the personal user IDs but also a general operation flow in which a circulation sequence of a report is indicated by an arrangement of the authorities or the job titles of the users can be extrapolated. For example, when the job titles of the section staff the section chief and the manager are paired with Nakamura, Suzuki, and Tanaka, respectively, an operation flow that "a report in the form A is circulated in a sequence of a section staff→a section chief→a manager" can be extrapolated in the foregoing flow. The correspondence between the user IDs and the authorities or the job titles of the users may be registered in the user authentication server 28 in advance, for example.

Also, when attention is given to pairs of the user IDs and the process contents in the job logs, an operation flow that "Nakamura prints/scans a report in the form A, then Suzuki copies it, and finally Tanaka scans it" can be extrapolated. When information of the authorities or the job titles of the users is used, an operation flow that "a section staff prints/scans a report in the form A, then a section chief copies it, and finally a manager scans it" can be extrapolated.

Also, when respective equipment name attributes in the job logs are utilized, an operation flow that "a section staff prints and scans a report in the form A by the multifunction machine MF1, then a section chief copies it by the multifunction machine MF2, and finally a manager scans it by the scanner SC1", for example, can be extrapolated. Also, when a location where the equipment is installed is registered in the analysis sever 24 in association with the equipment name, an operation flow indicating a location where users perform respective processes, instead of the equipments, can be extrapolated.

The above examples show the cases where the operation flow is extrapolated from the group of log records for one individual operation. The analysis sever 24 in this exemplary embodiment can extrapolate an operation flow by fully considering groups of log records for plural individual operations corresponding to the same report form.

For example, it is assumed that, as the subset of the log records, which correspond to the individual operation using the form A, a classification 12 shown in FIG. 15 is obtained as well as a classification 1 shown in FIG. 14. In this case, the analysis sever 24 can extrapolate an operation flow that is more versatile than that achieved from the information of one individual operation, based on the comparison between the arrangements of log records of plural subsets. For example, in the example shown in FIG. 15, Yamada who performed the process of a record 11 is a section staff. In this event, it is understood by way of the comparison between the first record (the record 1) of the classification 1 shown in FIG. 11 and the first record (the record 11) of a classification 12 shown in FIG. 15 that values of attribute items of the process contents and the equipment name except the user ID are identical with each other, and that the user IDs are identical with each other in terms of the job title. From the above, a flow element that "a section staff prints at first a report in the form A" can be extrapolated.

Then, the second record 2 of the classification 1 and the second record 12 of the classification 12 are compared with each other. However, attribute items in these records are not identical. That is, when the record 2 and the record 12 are compared after values of the respective attribute items thereof are replaced with their paired registered values (e.g., the job title paired with the user, and the install place paired with the equipment name) sequentially, both records are not identical with each other even after any item is replaced. Therefore, there is a possibility that either of the record 2 and the record 12 is not an essential process stage. Also, when the record 2 and a record 15 in the classification 12 are compared, a coincidence therebetween is not found even after values of respective attribute items are replaced. Accordingly, it is understood that no log record corresponding to the record 2 is present in the classification 12. In contrast, respective items of the user ID, the equipment name, and the process contents of the record 12 are identical with those of the record 6 in the classification 1. It can be extrapolated from the above that the process stage represented by the record 2 is not essential (i.e., it is arbitrary whether or not this stage is executed). Then, respective item values of the user ID, the equipment name, and the process contents of the record 6 are identical with those of the record 12, and respective item values of the user ID, the equipment name, and the process contents of the record 4 are identical with those of the record 15. Therefore, it can be extrapolated that the record 6 and the record 12 represent a same process stage and that the record 4 and the record 15 represent another same process stage. By all accounts, an operation flow that "first a section staff prints a report in the form A, then this section staff may scan it, further a section chief copies it, and finally a manager scans it" can be extrapolated. Of course, in this case, the equipment names used in the respective process stages and the corresponding install locations may be described in the operation flow.

Also, with regard to image logs of log records that are contained in each subset in time series, it may be detected as to whether or not it is necessary to append a note or put a stamp in each process stage by obtaining a difference image between adjacent image logs. Then, information of the detection result may be described in an operation flow.

Figure 16:
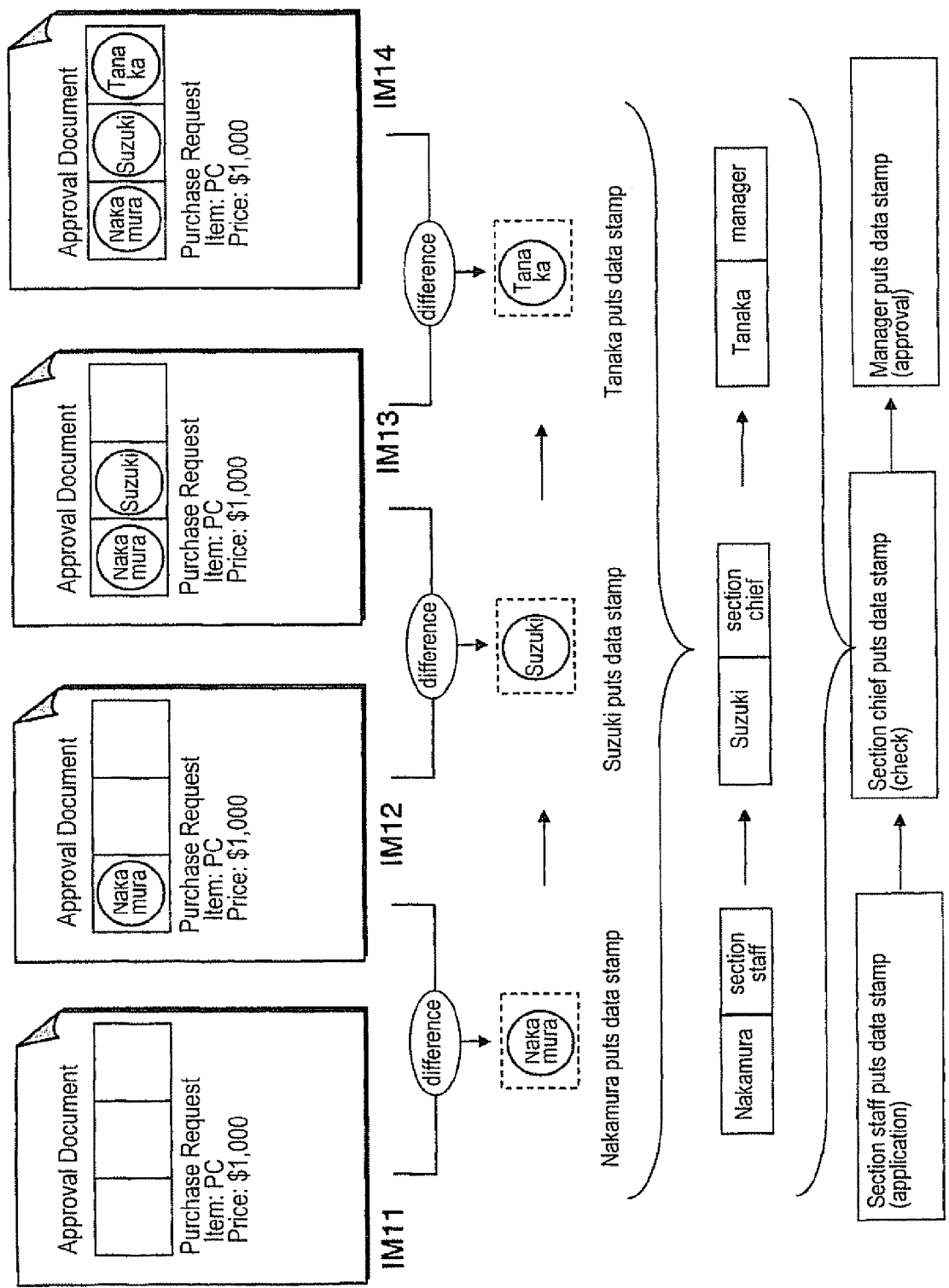
FIG. 16 is a view explaining a determination process using a difference image.

For example, in an example shown in FIG. 16, "IM11" denotes the image log when Nakamura first prints the report of the example shown in FIG. 3. Also, "IM12" denotes the image log when Nakamura puts a date stamp on the report, and scans it. Also, "IM13" denotes the image log when Suzuki receives the report from Nakamura, puts a date stamp thereon, and copies it. Also, "IM14" denotes the image log when Tanaka receives the report from Suzuki, puts a date stamp thereon, and scans it.

When a difference image between the IM11 and the IM12 is generated, the date stamp put by Nakamura is extracted as a difference. Similarly, the date stamp put by Suzuki is extracted as a difference image between the IM12 and the IM13, and the date stamp put by Tanaka is extracted as a difference image between the IM13 and the IM14. From the above, an operation flow that "Nakamura (section staff) prints a report in the form A, puts a date stamp thereon, and scans it, then Suzuki (section chief) puts a date stamp on the report and copies it, and finally Tanaka (manager) puts a date stamp on the report and scans it" can be extrapolated. If an image of each user's date stamp is registered in the user authentication server 28 in association with a corresponding user ID or the like, it can be determined who puts a date stamp. Therefore, the above operation flow can be extrapolated.

In the above, described is the example in which it is determined, using a difference image, as to whether or not a date stamp has been put. However, a determination target is not limited to putting of a stamp. For example, if columns to be filled by respective users are provided in a report, it may be determined who fills which column in each process stage, and information of the determination result may be described in an operation flow.

The method for extrapolating an operation flow described above is just one example.

As can be seen from the above example, when one or more subsets of log records corresponding to one report form are obtained, the number of operation flows extrapolated from one or more subsets is not limited to one. For example, in some case, both (i) an operation flow in which persons who executes respective process stages are specified by user IDs and (ii) an operation flow in which the persons who execute the respective process stages are specified by job titles are estimated. Therefore, such a system may be employed that plural operation flows are presented to an operator of the analysis sever 24 and then, the operator chooses the adequate one among them.

Also, the operation flow extrapolated by the analysis sever 24 is not always accurate. Therefore, the analysis sever 24 may present the extrapolated operation flow(s) to its operator, and then may employ a formal operation flow after the operator corrects the extrapolated operation flow(s).

The exemplary embodiment has been described above. Next, a modification example of the exemplary embodiment will be described below. In the above exemplary embodiment, the process for extrapolating an operation flow obtains the operation flow by rearranging log records of each group (each subset), which are results of the fine-sorting for each same document, in order of process times (time stamps). In contrast, in this modification example, information relating to an operation flow is obtained by sorting the groups of log records based on not the process times but the attribute values of the process contents.

Figure 17:
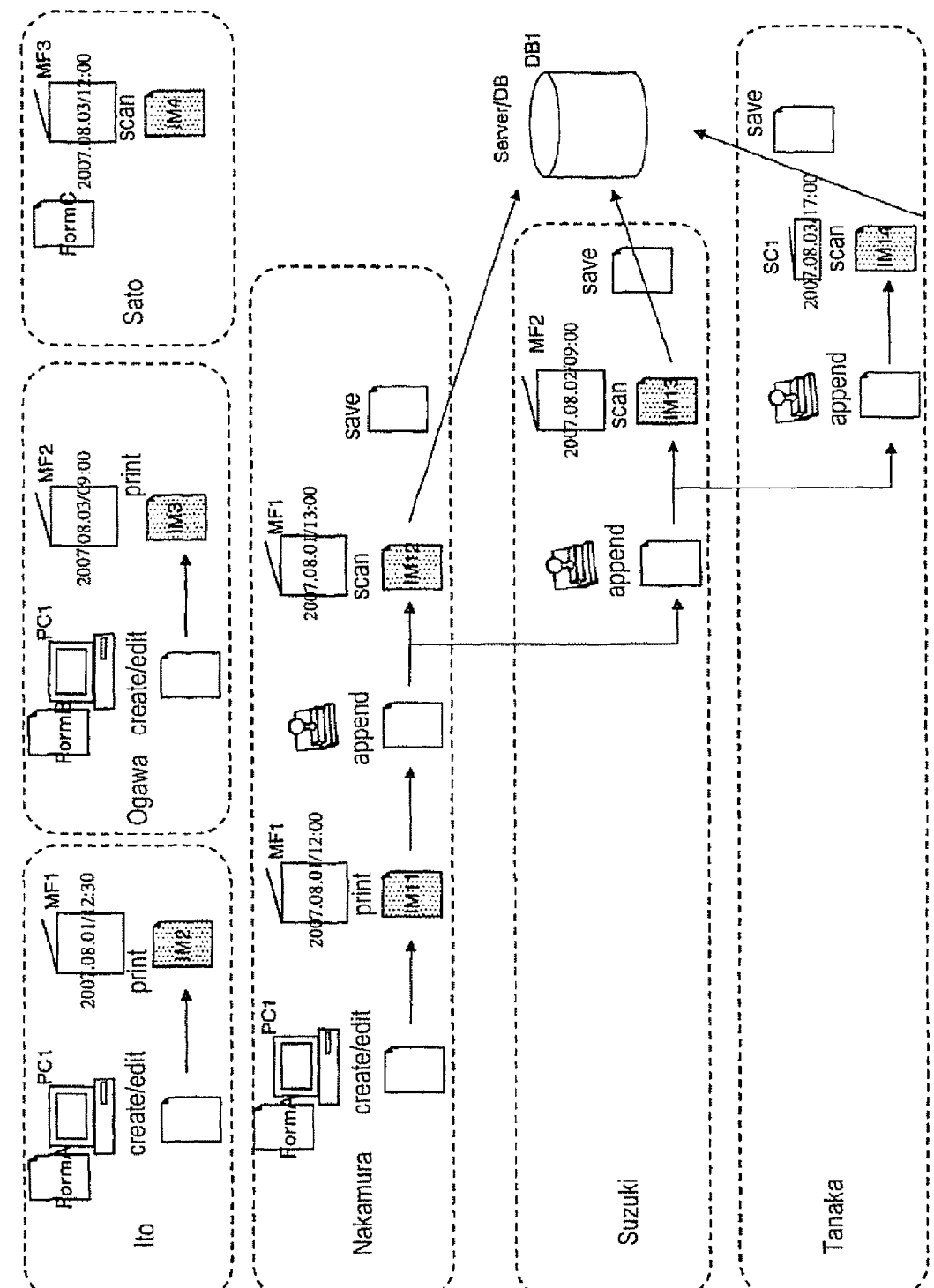
FIG. 17 is a view showing examples of a work flow, which are explained in a modification example.

FIG. 17 shows a flow of works with reference to which the modification example will be described. This example is similar to the example shown in FIG. 2. The example shown in FIG. 17 is different from that shown in FIG. 2 in that Suzuki does not copy the report but scans it and that Nakamura, Suzuki, and Tanaka register the scanned image in a common storage location (a database DB1 in FIG. 17). The users may designate the storage locations by URL or the like at a time of scanning, for example.

In this example, it is assumed that, when a process content is scanning, a name of an equipment (in this case, the DB1) serving as the registration destination of the scanned image is registered in an equipment name attribute of a job log in place of a name of a equipment that executes the scanning (alternatively, an attribute item of the name of the equipment, which is the registration destination of the image, may be added, and then both this item and the name of the equipment that executes the scanning may be recorded).

Figure 5:
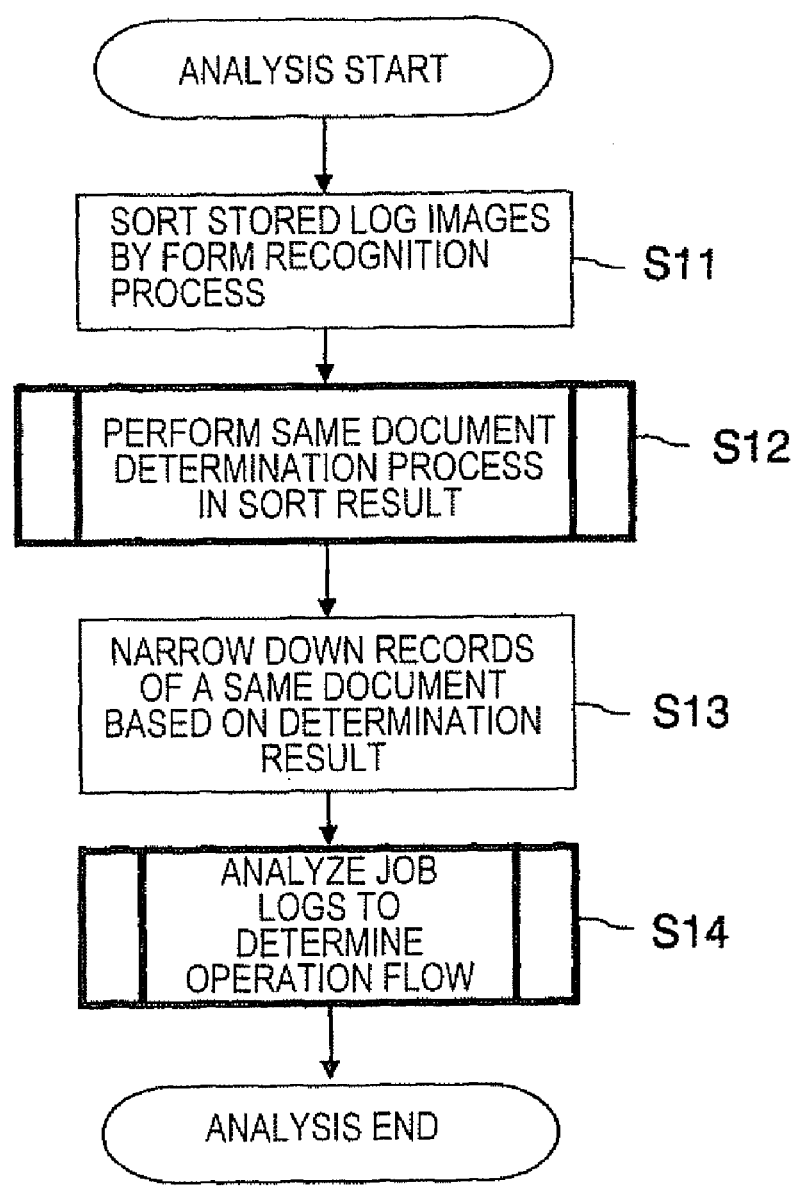
FIG. 5 is a view showing procedures of a process of extrapolating an operation flow, executed by an analysis server.
Figure 19:
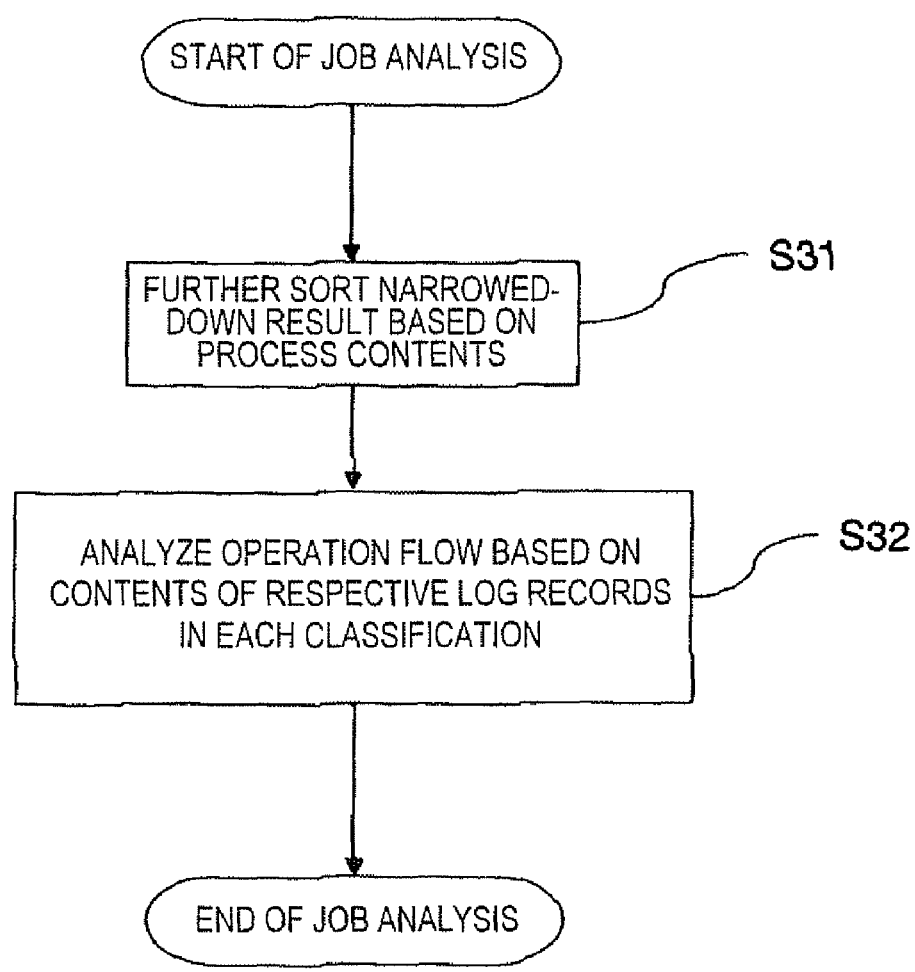
FIG. 19 is a flowchart showing another example of procedures in the same document determination process.

An outline of the flow of the process that the analysis sever 24 executes is similar to the flow shown in FIG. 5. When the process in step S13 is performed, a subset of log records corresponding to the form A shown in FIG. 18 which is the fine-sort result for each same document is obtained from the example of FIG. 17. The flow executed up to here is the same as that in the above exemplary embodiment. However, the process for extrapolating an operation flow being executed subsequently is different from that of the above exemplary embodiment. FIG. 19 shows an example of procedures of the process for extrapolating an operation flow according to this modification example. In this example, the subset obtained by the fine-sorting is sorted again based on values of the process content attributes (S31). For example, when records having the process content of the "scan" are extracted, the records 2, 4, 6 are obtained as shown in FIG. 20.

When it is found in the sort result that plural log records have one process content, the analysis sever 24 extracts a common thing in attributes of the plural log records and detects a condition about the operation flow based on the extracted common thing (S32). For example, in the example shown in FIG. 20, it is understood that all log records belonging to one classification of the sort result register the scan images in the same database DB1. Accordingly, the condition about the operation flow that "Nakamura (section staff), Suzuki (section chief), and Tanaka (manager) scan a report, and then store all images of the scan results in the database DB1" is obtained.

Also, the respective log records belonging to one classification of the sort results in step S31 may be rearranged in terms of the job titles or the user's authorities corresponding to the respective user IDs. The order of rearrangement may be set in ascending order of the job titles or the user's authorities, for example. The job titles or the user's authorities may be acquired from the user authentication server 28. An operation flow that "Nakamura (section staff), Suzuki (section chief), and Tanaka (manager) scan a report, and then store images of the scan result in this order in the database DB1 while managing its version" can be extrapolated by applying analysis in step S32 to the rearranged result.

In respective examples described above, by comparing the image logs in the log records with each report form data 200, it is determined what report form data 200 should be used in an operation flow to which each log record corresponds, and then what individual operations use documents corresponding to the log records. However, these examples are given merely by way of example. Another example will be described below.

In this example, a set of log records corresponding to a "same document" is obtained only based on a comparison between image logs of log records. The sorting based on the comparison between the image logs and the report form data 200 is not executed.

Figure 21:
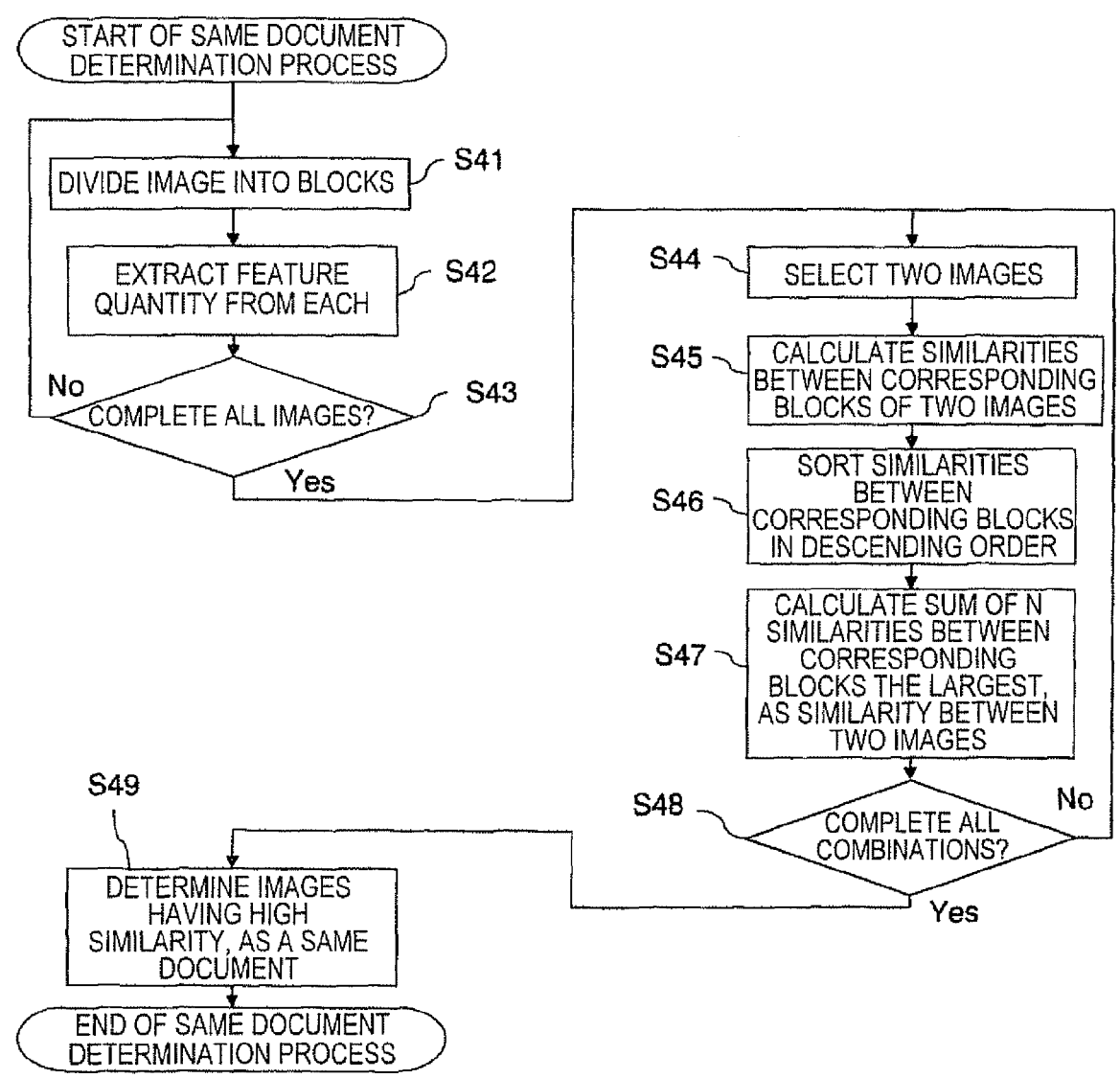
FIG. 21 is a flowchart showing still another example of the same document determination process.

In this case, the analysis sever 24 obtains the set of log records corresponding to the "same document" using procedures shown in FIG. 21, for example. In this procedure, a similarity between two image logs is calculated, and a pair of image logs having a high similarity therebetween (for example, the similarity exceeds a predetermined threshold value) are determined as belonging to a same document. As a method for calculating the similarity between two image logs, for example, a method disclosed in JP 2004-21430 A may be used. FIG. 21 shows an example of the procedures when the method of JP 2004-21430 A is used.

In this procedure, first respective images are divided into blocks having a predetermined size (S41). Then, a feature quantity is extracted from each block (S42). The feature quantity may be an average brightness, an average color, an edge amount in each block. The extracting of the feature quantity of each block is applied to all image data (S43).

Then, a combination of two image logs is selected from all the image logs (S44). Then, a similarity between feature quantities of corresponding blocks is calculated by looking up the feature quantities of the corresponding blocks of the two images (S45). The calculating of the similarity is carried out based on comparison between feature quantities of blocks (corresponding blocks) that are located in the same position in the two images. For example, when each image log is divided into 10×10=100 blocks in total, the two images are divided into 100 blocks. A similarity between the corresponding blocks is calculated in sequence in such a way that first a similarity between the blocks #1 is calculated, then a similarity between the blocks #2 is calculated, and so on. As a result, 100 similarities are calculated by repeating these processes.

Then, 100 similarities are rearranged in descending order of similarity (S46). Then, a sum of the N similarities between the corresponding blocks, which are selected from the highest similarity in descending order, is calculated as a "similarity between the two image logs" (S47). Here, N is a threshold value that an administrator or the like sets in advance. For example, if 10×10=100 blocks are given, a threshold value N=80 may be set.

In this way, the similarity is calculated in all combinations (pairs) of image logs (S48). Then, the image logs whose similarity calculated in this manner is high (e.g., a similarity is equal to or lager than a predetermined threshold value) are determined as a same document (S49).

Figure 22:
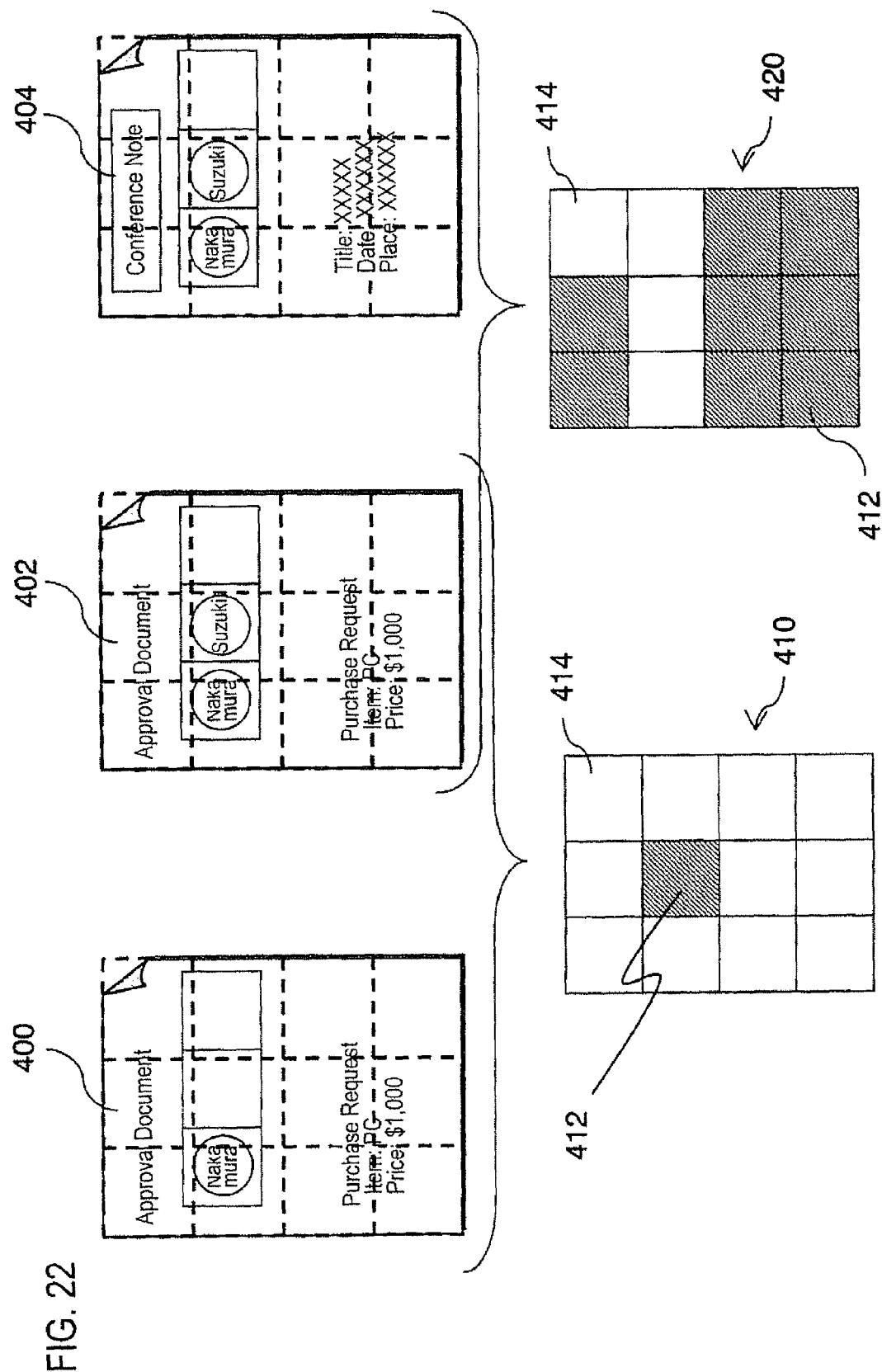
FIG. 22 is a view explaining a method for determining a same document in the example shown in FIG. 20.

FIG. 22 shows schematically the calculation of the similarity between two image logs. First, a similarity between images of an image log 400 and an image log 402 is calculated. For this purpose, the image log 400 and the image log 402 are divided into blocks. Here, for the convenience of explanation, the images are divided into 3×4=12 blocks. Then, a feature quantity is calculated for each block. The feature quantities between the blocks located in the same positions of the two images are compared with each other. Since the images are only different in a seal of Suzuki, a similarity between blocks containing the seal of Suzuki is low, and similarities between the remaining blocks are high. In a comparison result 410 shown in FIG. 22, blocks having similarities equal to or larger than a threshold value are illustrated by white blocks 414, and blocks having similarities below the threshold value are illustrated by obliquely hatched blocks 412. Only one block having a low similarity is found in the comparison between the image log 400 and the image log 402. Here, it is assumed that a sum of the similarities of 10 blocks, which are selected from the highest similarity in descending order, is set as a similarity between the image log 400 and the image log 402. Since the block having the low similarity (the block having a seal of Suzuki) is not used in calculating the similarity between the image log 400 and the image log 402. Therefore, the similarity between the image logs 400, 402 becomes high as a whole, and as a result, the image logs 400, 402 are determined as a same document.

Then, a similarity between the image of the image log 402 and an image of an image log 404 is calculated. Similarly, the image log 402 and the image log 404 are divided into blocks, and feature quantity is calculated for each block. Then, the feature quantities between the corresponding blocks are compared. Since two images are quite different images, similar blocks are not so many as in the foregoing example. Since only the similarity between the stamp column and the upper right portion is high, a comparison result 420 is obtained. It is assumed that a sum of the similarities of 10 blocks selected from the highest similarity is set as a similarity between the image log 402 and the image log 404. Since many blocks having low similarities are contained therein, the resultant similarity between the image logs 402, 404 is lower than the preceding example. Therefore, it can be determined that the image log 402 and the image log 404 are not a same document.

Figure 23:
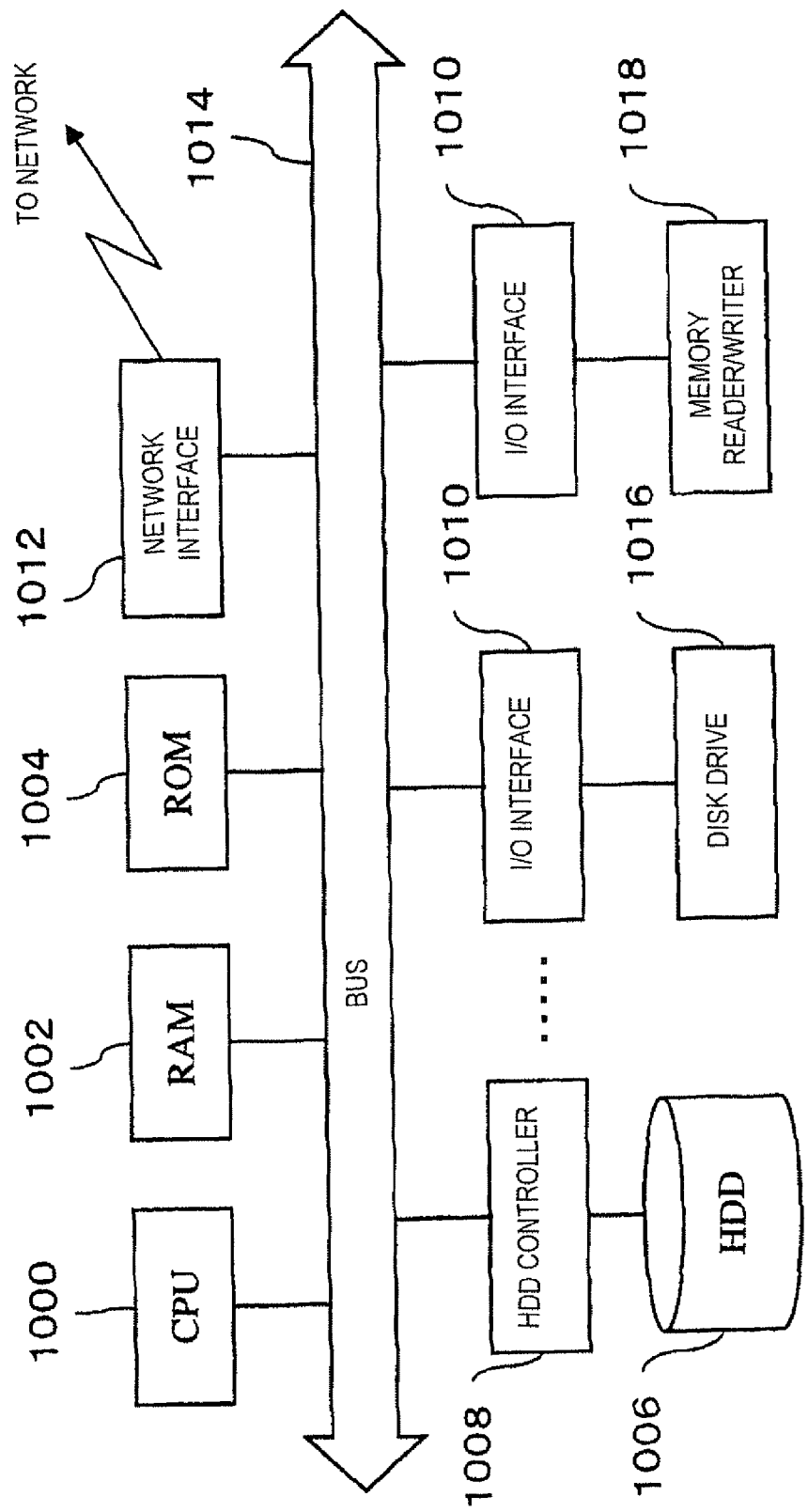
FIG. 23 is a view showing an example of the hardware configuration of a computer.

The analysis sever 24 illustrated in above examples can be implemented by causing a general-purpose computer to execute a program that expresses the processes of respective function modules mentioned above, for example. Here, as shown in FIG. 23, for example, the computer has such a circuit configuration as the hardware that a microprocessor such as a CPU 1000, or the like, memories (primary memories) such as a random access memory (RAM) 1002, a read-only memory (ROM) 1004, and the like, a HDD controller 1008 for controlling a HDD (hard disc drive) 1006, various I/O (input/output) interfaces 1010, a network interface 1012 for controlling the connections for networks such as a local area network, and the like are connected via a bus 1014, for example. Also, a disc drive 1016 for reading and/or writing a portable disc recording medium such as CD, DVD, or the like, and a memory reader/writer 1018 for reading and/or writing a portable nonvolatile recording medium such as a flash memory, or the like, and others may be connected to the bus 1014 via the I/O interface 1010, for example. The program on which the process contents of respective function modules illustrated above is save in the fixed storage device such as the hard disc drive via the recording medium such as CV, DVD, or the like or via the communicating means such as the network, or the like, and then installed into the computer. When the program stored in the fixed storage device is read out into the RAM 1002 and is executed by the microprocessor such as the CPU 1000, or the like, the functional module groups exemplified as above are implemented. In this event, a part or all of these function module groups may be constructed by a hardware circuit such as a dedicated LSI (Large Scale Integration), ASIC (Application Specific Integrated Circuit), FPGA (Field Programmable Gate Array), or the like.

What is claimed is:

1. An operation procedure extrapolating system comprising:
    a history recording unit that records history records of processes that at least one image processing apparatus is instructed to perform in a series of operations, each history record including operator information indicating an operator who instructs execution of a corresponding process, time information indicating a time at which the corresponding process is executed, content information indicating contents of the corresponding process, and an object image as an object of the corresponding process;
    a sort unit that sorts the history records so as to classify operations into sets defined for individual operations, based on a comparison among the object images included in the respective history records recorded in the history recording unit; and
    an extrapolating unit that extrapolates orders of operations in at least one of the individual operations, based on (i) the content information of the history records of the operations included in the set defined for the at least one of the individual operations and (ii) a sequence of the operator information of the history records of the operations included in the set defined for the at least one of the individual operations, wherein
    the individual operations are a series of operations that have all been executed with respect to one particular report, and
    the object image for each individual operation of the series of operations includes a same common-portion information identifying said each individual operation as corresponding to the one particular report.

2. The operation procedure extrapolating system according to claim 1, further comprising:
    a first storage unit that stores report information which represent forms of respective reports, wherein
    the sort unit includes
        a determination unit that determines what report information corresponds to each history record, based a on comparison between the object images included in the respective history records recorded in the history recording unit and the report information stored in the first storage unit, and
        a fine sort unit that sorts the history records belonging to each history record group into the sets defined for the individual operations, based on a comparison between the object images of the history records included in each history record group, wherein each history record group is determined by the determination unit as corresponding to a same report information.

3. The operation procedure extrapolating system according to claim 2, further comprising:

a second storage unit that stores the common-portion information for each form, wherein each common-portion information indicates portions, which the same in all processing stages of the corresponding individual operation, of images of reports having the corresponding form, wherein the fine sort unit sorts the history records belonging to each history record group into the sets defined for the individual operations, based on the portions, indicated by the common-portion information of the report information corresponding to each history record group, of the object images of the history records of each history record group, being the same.

4. The operation procedure extrapolating system according to claim 1, wherein the extrapolating unit a sequencing unit sequences the history records included in each set based on the time information of the history records, and a determination unit that determines as to whether or not a sequence, provided by the sequencing unit, of pairs of (i) the content information of the history records of each set and (ii) the operator information of the history records of each set satisfies (a) a condition relating to an execution sequence in respective process stages, which is indicated by operation definition information of the individual operation corresponding to each set, and (b) a condition relating to operators in the respective process stages, which are indicated by the operation definition information of the individual operation corresponding to each set.

5. A non-transitory computer-readable medium storing a program that causes a computer to execute:

recording history records of processes that at least one image processing apparatus is instructed to perform in a series of operations, each history record including operator information indicating an operator who instructs execution of a corresponding process, time information indicating a time at which the corresponding process is executed, content information indicating contents of the corresponding process, and an object image as an object of the corresponding process;

sorting the history records so as to classify operations into sets defined for individual operations, based on a comparison among the object images included in the respective history records recorded in the history recording unit; and extrapolating orders of operations in at least one of the individual operations, based on (i) the content information of the history records of the operations included in the set defined for the at least one of the individual operations and (ii) a sequence of the operator information of the history records of the operations included in the set defined for the at least one of the individual operations, wherein the individual operations are a series of operations that have all been executed with respect to one particular report, and the object image for each individual operation of the series of operations includes common-portion information identifying said each individual operation as corresponding to the one particular report.

6. An operation procedure extrapolating method comprising:

recording history records of processes that at least one image processing apparatus is instructed to perform in a series of operations, each history record including operator information indicating an operator who instructs execution of a corresponding process, time information indicating a time at which the corresponding process is executed, content information indicating contents of the corresponding process, and an object image as an object of the corresponding process;

sorting the history records so as to classify operations into sets defined for individual operations, based on a comparison among the object images included in the respective history records recorded in the history recording unit; and extrapolating orders of operations in at least one of the individual operations, based on (i) the content information of the history records of the operations included in the set defined for the at least one of the individual operations and (ii) a sequence of the operator information of the history records of the operations included in the set defined for the at least one of the individual operations, wherein the individual operations are a series of operations that have all been executed with respect to one particular report, and the object image for each individual operation of the series of operations includes common-portion information identifying said each individual operation as corresponding to the one particular report.

* * * * *